W. H. ARNOLD.
TROLLEY WHEEL CONSTRUCTION.
APPLICATION FILED DEC. 26, 1912.
1,070,658.
Patented Aug. 19, 1913.
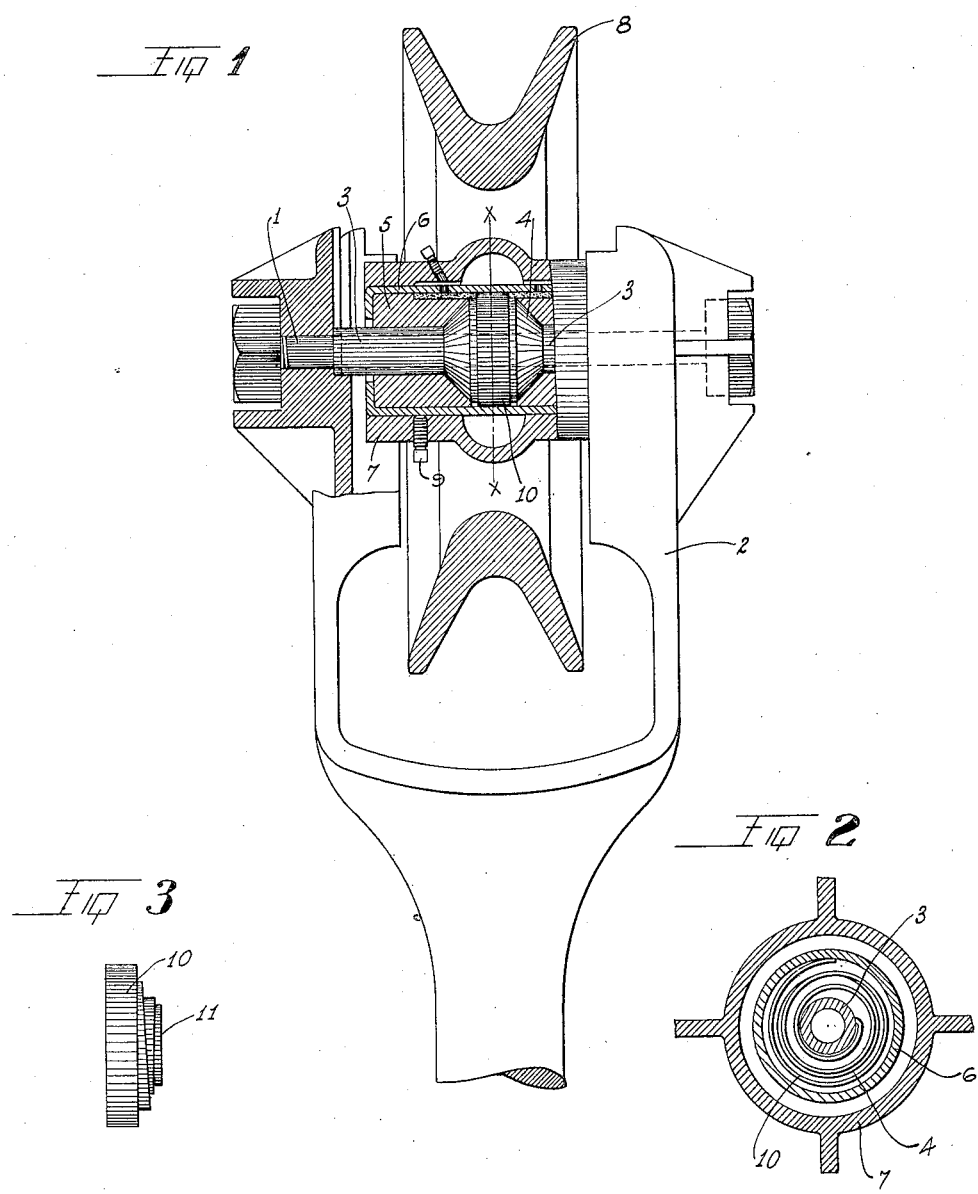
Witnesses
Clarence M. Smith
J. B. Webster
Inventor
William H. Arnold
Attorney

UNITED STATES PATENT OFFICE.

WILLIAM H. ARNOLD, OF STOCKTON, CALIFORNIA.

TROLLEY-WHEEL CONSTRUCTION.

1,070,658.  Specification of Letters Patent. Patented Aug. 19, 1913.

Application filed December 26, 1912. Serial No. 738,508.

*To all whom it may concern:*

Be it known that I, WILLIAM H. ARNOLD, a citizen of the United States, residing at Stockton, in the county of San Joaquin, State of California, have invented certain new and useful Improvements in Trolley-Wheel Construction; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in trolley wheels and particularly to the bearing means thereof and means for inserting the same in the trolley harp, the object of the invention being to produce a simplified form of direct contact means between the trolley wheel and the bearing pin and the harp and thence to the motor mechanism of the car.

A further object of the invention is to produce a simple and inexpensive device and yet one which will be exceedingly effective for the purposes for which it is designed.

These objects, I accomplish by means of such structure and relative arrangement of parts as will fully appear by a perusal of the following specification and claims.

On the drawings similar characters of reference indicate corresponding parts in the several views.

Figure 1 is a sectional view of the trolley harp construction showing the contact means therein. Fig. 2 is a sectional view taken on a line X—X of Fig. 1. Fig. 3 is a detached side view of a contact pin spring.

Referring now more particularly to the characters of reference on the drawings, the numeral 1 designates the pin of the trolley harp 2 which trolley harp is suitably constructed to receive upon said pin another pin 3 on which are two spaced bearing shoulders 4 disposed over which are two bushings 5 inclosed in a casing 6. Said casing 6 is disposed within the hub of the said trolley wheel 8. If desired the casing 6 may be held in the hub 7 by means of set screws 9 or other suitable means thus permitting the said casing 6 to be removed and replaced. As stated, shoulders 4 are spaced apart and in the intermediate space is a helical spring 10. A portion of said spring, as at 11, projects gradually out of the plane of the outer circumference of said spring, said outer circumference of said spring bearing against the inside of the casing 6, while the apex 11 bears continuously against one of the shoulders 4. Thus a continuous connection is made between the wheel 8, hub 7, casing 6, spring 10, apex or spring 11, shoulder 4, pin 3 and pin 1 to the harp 2 and thence in the usual manner to the machinery of the car upon which the trolley harp is mounted.

From the foregoing description it will readily be seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:

1. A device of the character described comprising a hub, a bearing pin in said hub having two shoulders spaced apart, a substantially conical shaped helical spring in said hub between said shoulders, the outer periphery of said spring bearing against said hub, the apex of said spring bearing against one of said shoulders and its base against the other shoulder.

2. A device of the character described comprising a wheel, a hub thereon, a casing in said hub, a pin in said casing having two spaced shoulders, bushings in said casing bearing against said shoulders, a substantially conical shaped helical spring disposed between said shoulders and bearing against said casing at its outer periphery, the apex of said spring bearing against one of said shoulders and the base of said spring bearing against the other shoulder.

3. A device of the character described comprising a wheel having a hub, a bearing pin in said hub, two shoulders on said pin spaced apart forming an intermediate space disposed centrally with respect to said hub, a substantially conical shaped helical spring mounted in the space between said shoulders, the outer periphery of said spring bearing against said hub, the apex of said spring bearing against one of said shoulders and its base against the other shoulder.

In testimony whereof I affix my signature in presence of two witnesses.

WILLIAM H. ARNOLD.

Witnesses:
 STEPHEN M. BLEWETT,
 CLARENCE M. SMITH.

Copies of this patent may be obtained for five cents each, by addressing the "Commissioner of Patents, Washington, D. C."